(12) United States Patent
Sibomana et al.

(10) Patent No.: US 7,324,624 B2
(45) Date of Patent: Jan. 29, 2008

(54) SHIFTED TRANSMISSION MOCK FOR NUCLEAR MEDICAL IMAGING

(75) Inventors: Merence Sibomana, Knoxville, TN (US); Mark W. Lenox, Harriman, TN (US); Larry Byars, Oak Ridge, TN (US); Christian J. Michel, Lenoir City, TN (US); Danny Newport, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 292 days.

(21) Appl. No.: 11/251,232

(22) Filed: Oct. 14, 2005

(65) Prior Publication Data
US 2007/0090300 A1    Apr. 26, 2007

(51) Int. Cl.
*G01T 1/29* (2006.01)
(52) U.S. Cl. .................................. 378/19; 250/363.01
(58) Field of Classification Search .................. 378/4, 378/13–16, 19; 250/363.01, 363.02, 363.03, 250/370.09, 370.1
See application file for complete search history.

(56) References Cited

U.S. PATENT DOCUMENTS

| | | | | |
|---|---|---|---|---|
| 6,410,919 B1* | 6/2002 | Nickles | .................. | 250/363.03 |
| 6,429,433 B1* | 8/2002 | Gagnon et al. | ........ | 250/363.02 |
| 7,026,622 B2* | 4/2006 | Kojima et al. | ......... | 250/363.03 |

* cited by examiner

*Primary Examiner*—Hoon Song

(57) ABSTRACT

Emission contamination data are collected in a shifted mock scan simultaneous with the collection of transmission data during a transmission scan of a patient with a collimated gamma point source, the transmission data are corrected with the emission contamination data, and the corrected transmission data are used for attenuation correction of emission data for reconstruction of an emission image of the patient. In a preferred implementation, when the point source is at a particular axial location and illuminates an axial beamwidth of "Fz" over the gamma detector, emission contamination data are collected from the gamma detector over an axial separated region "Fz'" having about the same axial extent but axially displaced by about half of the axial field of view (FOV).

23 Claims, 10 Drawing Sheets

LLD SET AT 550 KEV

LLD SET AT 600 KEV

SHIFTED TRANSMISSION MOCK FOR NUCLEAR MEDICAL IMAGING

BACKGROUND OF THE INVENTION

1. Field of the Invention

The present invention relates generally to nuclear medical (NM) imaging such as such as positron emission tomography (PET) and single photon emission computed tomography (SPECT), and more particularly to correction of emission contamination in transmission scans.

2. Description of the Background Art

Medical imaging is one of the most useful diagnostic tools available in modern medicine. Medical imaging allows medical personnel to non-intrusively look into a living body in order to detect and assess many types of injuries, diseases, conditions, etc. Medical imaging allows doctors and technicians to more easily and correctly make a diagnosis, decide on a treatment, prescribe medication, perform surgery or other treatments, etc.

There are medical imaging processes of many types and for many different purposes, situations, or uses. They commonly share the ability to create an image of a bodily region of a patient, and can do so non-invasively. Examples of some common medical imaging types are nuclear medical (NM) imaging such as positron emission tomography (PET) and single photon emission computed tomography (SPECT), electron-beam X-ray computed tomography (CT), magnetic resonance imaging (MRI), and ultrasound (US). Using these or other imaging types and associated machines, an image or series of images may be captured. Other devices may then be used to process the image in some fashion. Finally, a doctor or technician may read the image in order to provide a diagnosis.

PET uses positron-emitting isotopes to label common biological compounds in order to study metabolic and physiologic functioning. The biological compounds are injected into a patient and become concentrated in certain locations of interest in a patient's body. Shortly after a positron is emitted by the radioactive isotope, the positron collides with an electron, causing the positron and the electron to annihilate each other. Annihilation of the positron and electron results in a pair of 511 Mev gamma rays being emitted at the same time at approximately a 180° angle to each other. The patient is placed in a PET scanner to detect coincident emission of such gamma rays.

The PET scanner has an array of scintillation crystals and an array of photo-detectors for detecting when a gamma ray strikes a scintillation crystal. When two coincident gamma rays are detected, a record is made of the two scintillation crystals struck by the gamma rays. The two locations of the scintillation crystals define a line passing very close to the point of origin of the two gamma rays. A sufficient number of such coincident events are recorded in order to identify concentrations of the radioactive isotope in the patient. Digital image processing techniques permit the reconstruction of a three-dimensional image of the concentrations of the radioactive isotope in the patient.

For example, a commonly used positron-emitting isotope is Fluorine-18, which has a half-life about 110 minutes. The Fluorine-18 is produced in a cyclotron and is typically used to make Fluoro-deoxyglucose (FDG). FDG is a sugar that is metabolized by cells in the body. When FDG is injected into a patient, the FDG becomes distributed throughout the body in about an hour. The FDG, however, becomes more concentrated in parts of the body where the cells are more active. Since many cancers consist of very actively growing cells, the FDG becomes concentrated in such active cancers. When the patient is placed in the PET scanner, an image of the active cancers can be reconstructed from the coincident events recorded from the scanner. As described in Townsend et al. U.S. Pat. No. 6,490,476 issued Dec. 3, 2002, incorporated herein by reference, the PET scanner can be combined with an X-RAY CT scanner in order to provide anatomical images from the CT scanner that are accurately co-registered with the functional images from the PET scanner without the use of external markers or internal landmarks.

Image reconstruction from recorded coincident events can be more precise if corrections are made for scatter and attenuation of the gamma rays while the gamma rays pass through the patient's body. To enable such corrections, a transmission scan of the patient is made simultaneously with the recording of coincident gamma rays emitted from the patient. To make the transmission scan, the patient is irradiated by gamma rays from an external source, such as a Ge-68 (positron emitter) or Cs-137 (662 keV gamma) point source. However, any single gamma point source within the energy range of 50-700 keV can be used for the transmission scan. Recorded single gamma ray events presumed to originate from the point source are converted to an attenuation map of the patient. When a Cs-137 point source is used, the transmission data are scaled based on predetermined attenuation coefficients of the indicated class of body material; for example, for soft tissue or water, from a µ-value of 0.086 $cm^{-1}$ at 662 keV to 0.095 $cm^{-1}$ at 511 keV. The attenuation map is used to correct the associated emission scan of the patient.

Typically the recording of the transmission scan will cause emission contamination (EC) of the transmission data because of the presence of the 511 keV photons being emitted from the patient. The transmission data should be corrected for the emission contamination in order to avoid transmission image artifacts and underestimation of the reconstructed attenuation coefficients that in turn may result in incorrect attenuation and scatter coefficients. Several methods for performing such a correction are discussed in Hugo W. A. M. de Jong et al., "Correction for Emission Contamination in Transmission Scans for the High Resolution Research Tomograph," IEEE Transactions on Nuclear Science, Vol. 51, No. 3, June 2004, pp. 673-676. These methods include histogram based scaling, segmentation, and subtraction of an estimated EC-contribution from the transmission data prior to reconstruction.

In histogram-based scaling the reconstructed grey-value of water is found by determining the water-peak in the mu-value histogram of the transmission image. Next, the image is scaled to the mu-value expected at 511 keV (0.095 $cm^{-1}$). This method is said to intrinsically compensate for emission contamination. The transmission image can also be segmented to compensate for emission contamination. Segmentation is said to furthermore prevent the propagation of noise from the transmission image into the emission reconstruction. The threshold used for segmentation is set either to 50% of the theoretical expected mu-value of water ("fixed threshold") or to 50% of the mu-value found by the histogram procedure.

It is also possible to subtract an estimate of the EC contribution from the transmission data prior to reconstruction. This EC-estimation is often measured using a so-called mock-scan, which essentially is a (fast) transmission scan without using the transmission source. De Jong et al. investigated two EC-estimation methods based on the assumption that the EC of a singles transmission scan has a relatively uniform spatial distribution. The EC was estimated by: i) a uniform flat distribution or ii) a general non-uniform distribution reflecting only the block-dependent sensitivity for EC. The non-uniform EC estimation was obtained by subtracting the transmission scans of a 6 cm cylindrical phantom filled with 37 MBq and without activity.

SUMMARY OF THE INVENTION

Ideally, estimation of the emission contamination of a transmission scan is based on a real mock scan (i.e. an additional transmission scan without the source being exposed). Such a real mock scan, however, may be clinically unpractical since it may require additional scan time of about five minutes or more. Another possible method, the estimation of emission contamination based on phantoms after uniform or non-uniform scaling, is also undesirable for implementation at the clinical level. What is desired is a method of estimation of emission contamination that does not involve additional scan time for acquisition of list-mode data and that is sufficiently robust and general to be implemented at clinical level.

In accordance with one aspect, the invention provides a computer implemented method of performing a transmission scan of a patient while the patient is emitting radiation, and correcting the transmission scan for emission contamination from the patient. The method includes transmitting gamma rays into the patient from a collimated point source, and moving the collimated point source axially and circumferentially with respect to the patient, while detecting at a gamma detector gamma rays transmitted from the collimated point source through the patient and gamma rays emitted from the patient. The method further includes sorting gamma ray detection events from the gamma detector into transmission events detected over an axial beamwidth of the collimated point source over the gamma detector and emission contamination events detected over an axial region of the gamma detector axially separated and axially displaced from the axial beamwidth of the collimated point source over the gamma detector. The method further includes correcting the transmission events detected over the axial beamwidth of the collimated point source over the gamma detector with the emission contamination events detected over the axial region of the gamma detector.

In accordance with another aspect, the invention provides a computer implemented method of nuclear medical imaging. The method includes collecting transmission data of a transmission scan of a patient with a collimated gamma point source, the transmission data resulting from detection of gamma events over a beamwidth of the collimated gamma point source over a gamma detector of a nuclear medicine imaging apparatus while the gamma detector is also detecting gamma rays emitted by the patient. The method also includes collecting emission contamination data of a shifted mock scan during the transmission scan of the patient, the emission contamination data of the shifted mock scan resulting from detection of gamma events over a region of the gamma detector separated from the beamwidth of the collimated gamma point source over the gamma detector. The method further includes correcting the transmission data of the transmission scan of the patient with the emission contamination data of the shifted mock scan, and using the corrected transmission data of the transmission scan of the patient for reconstruction of an emission image of the patient.

In accordance with still another aspect, the invention provides a nuclear medical imaging system including a detector assembly including a gamma detector mounted for being circumferentially disposed about a patient, is and a collimated gamma point source mounted for axial and circumferential movement with respect to the patient. The system further includes at least one data processor coupled to the gamma detector and programmed for sorting gamma ray detection events from the gamma detector into transmission events detected over an axial beamwidth of the collimated point source over the gamma detector and emission contamination events detected over an axial region of the gamma detector axially separated and axially displaced from the axial beamwidth of the collimated point source over the gamma detector. The system further includes at least one data processor programmed for correcting the transmission events detected over the axial beamwidth of the collimated point source over the gamma detector with the emission contamination events detected over the axial region of the gamma detector.

In accordance with yet another aspect, the invention provides a nuclear medical imaging system including a detector assembly including a gamma detector mounted for being circumferentially disposed about a patient, and a collimated gamma point source mounted for axial movement with respect to the patient. The system further includes at least one data processor coupled to the gamma detector and programmed for collecting transmission data of a transmission scan of a patient with the collimated gamma point source, the transmission data resulting from detection of gamma events over a beamwidth of the collimated gamma point source over the gamma detector while the gamma detector is also detecting gamma rays emitted by the patient, and collecting emission contamination data of a shifted mock scan during the transmission scan of the patient, the emission contamination data of the shifted mock scan resulting from detection of gamma events over a region of the gamma detector separated from the beamwidth of the collimated gamma point source. The at least one processor is further programmed for correcting the transmission data of the transmission scan of the patient with the emission contamination data of the shifted mock scan of the patient, and using the corrected transmission data of the transmission scan of the patient for reconstruction of an emission image of the patient.

The above and other features and advantages of the present invention will be further understood from the following description of the preferred embodiments thereof, taken in conjunction with the accompanying drawings.

DETAILED DESCRIPTION OF THE PREFERRED EMBODIMENTS

Figure 1:
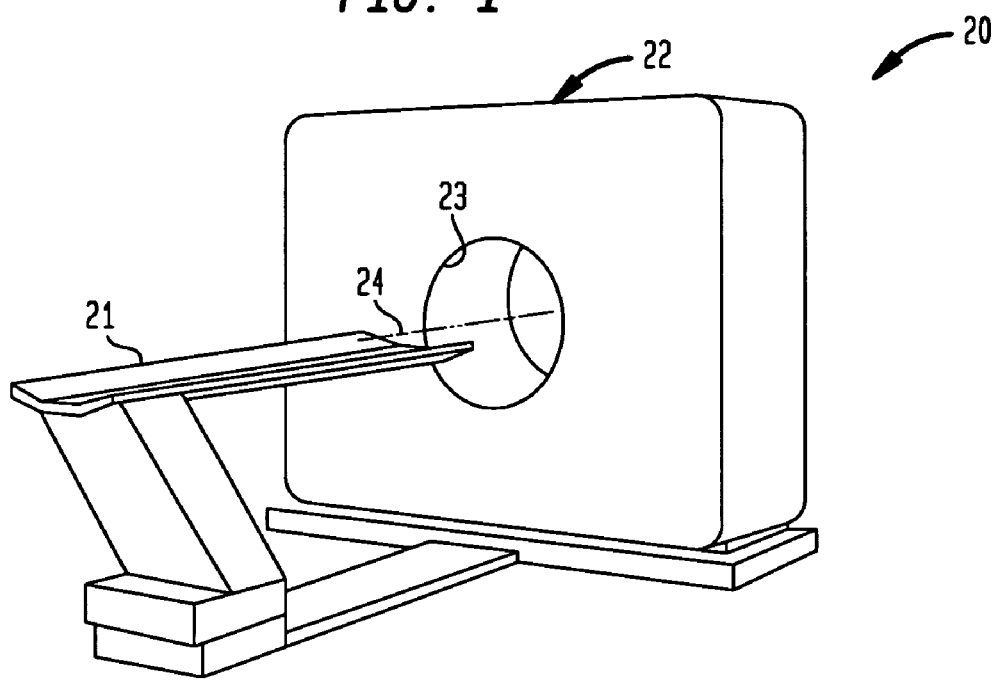
FIG. 1 is a perspective view of an imaging apparatus for nuclear medical imaging.

With reference to FIG. 1, there is shown one example of a positron emission tomographic (PET) imaging apparatus generally designated 20, to which the invention is applicable. The apparatus 20 includes a bed 21 for supporting a human patient (25 in FIG. 2) and a detector assembly 22 having a cylindrical hole 23 for receiving the patient. The bed 21 is aligned along an axis 24 of the hole 23 and is translated relative to the detector assembly along this axial direction for scanning of the whole body of the patient.

Figure 2:
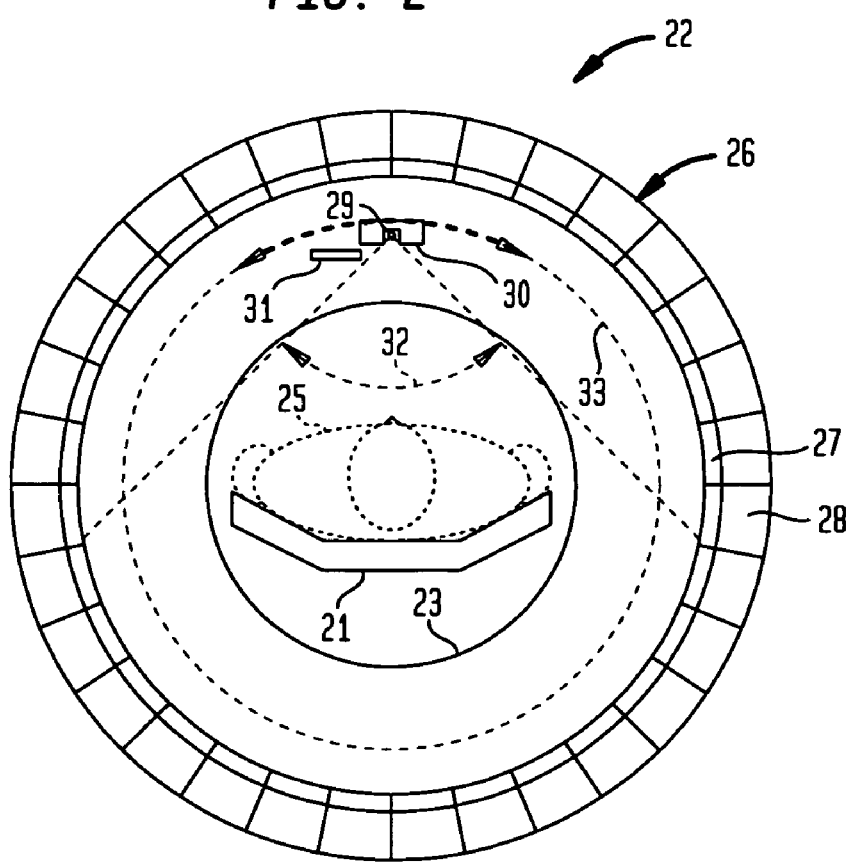
FIG. 2 shows an axial view of a gamma point source and detector array used in the apparatus of FIG. 1 for a whole-body transmission or emission scan of a human patient.

As further shown in FIG. 2, when the patient 25 is received in the hole 23, the patient is surrounded by a gamma detector array 26 including scintillating crystals 27 and photo-detectors 28. The scintillating crystals, for example, may be made of Lutetium oxyorthosilicate (LSO) and are arranged in a cylindrical array having a spacing of about 4 mm between the centers of adjacent crystals in the axial and trans-axial directions. The photo-detectors, for example, are photomultiplier tubes or photodiodes. An 8×11 array of the photomultiplier tubes, for example, may sense light from a corresponding 90×120 array of scintillation crystals. Circuitry responsive to the photomultiplier tubes can detect when a particular one of the crystals is struck by a gamma photon and identify the particular crystal struck by the gamma photon. Typically the scintillation crystals and the photodetectors are arranged as a ring of modules surrounding the hole 23.

As further shown in FIG. 2, the detector assembly 22 includes a gamma point source 29 mounted in a collimator 30 for transmission scanning of the patient. The point source 29, for example, includes a Ge-68 emitter of positrons that are annihilated to produce 511 keV gamma pairs (only one of which is used for the transmission scan), or a Cs-137 emitter of 662 keV gamma rays. For purposes of the invention, however, any single gamma point source emitting gamma photons of 50-700 keV is suitable. The collimator 30 has a relatively wide field of view 32 in the trans-axial direction so as to illuminate an entire trans-axial cross-section of the patient 25 when the body of the patient 25 fills the central hole 23 of the detector assembly 22 and a cover 31 is removed from the collimator. In order to uniformly illuminate the patient's body from all trans-axial directions, the collimator 30 is driven along a circumferential path 33 about the patient 25. Preferably the transmission scanning of the patient and the recording of "single" gamma events resulting from the gamma point source 29 is done simultaneously with the detection and recording of near simultaneous "coincidence" gamma events resulting from pairs of gamma photons emitted by the patient due to the positron-emitting radioisotope that has been injected into the patient.

Figure 3:
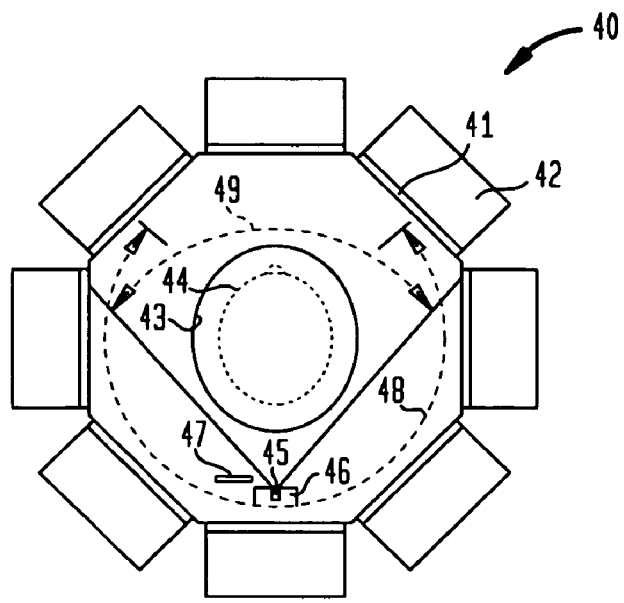
FIG. 3 shows an axial view of a gamma point source and detector array used for the transmission or emission scan of the head of a human patient.

FIG. 3 shows an alternative arrangement of a detector assembly 40 especially adapted for imaging of the head of a patient 44. In this case, the detector assembly 40 has a smaller central hole 43 that is sized to receive a human head. The detector assembly 40 has eight flat gamma detector panels, each including a rectangular array 41 of scintillation crystals and a corresponding array 42 of photo-detectors. As shown, for example, the scanner assembly includes an octagonal arrangement of eight gamma detector flat panels, and each flat panel includes an array of 10,800 LSO scintillation crystals (with a spacing of about 2.2 mm between adjacent crystals in the axial and trans-axial directions) and a corresponding array of 88 photo-multiplier tubes.

For transmission scanning, the detector assembly 40 further includes a single gamma emitter, such as a 30 mCi (1110 MBq) Cs-137 point source emitter 45 of 662 keV gamma rays. As explained above, the point source for transmission scanning may be any single gamma point source in the energy range of 50-700 keV. Solely for purposes of explanation of an embodiment of the invention, however, the point source will be assumed to be a Cs-137 point source hereinafter. The Cs-137 point source emitter 45 is disposed in a collimator 56. During transmission scanning, a cover 47 is removed from the collimator 56 and the point source and collimator are swung over a 280 degree arc 48 for illumination of the head 44 of the patient. It is noted that instead of cover 47 and associated actuator (see FIG. 5, component 66), the point source may be mounted on a movable mechanism, such as a movable arm, such that the entire point source would be moved into position for the transmission scan, and then removed from the area of the detector after the completion of the transmission scan. The collimator has a relatively wide trans-axial beamwidth 49 so that the point source 45 illuminates an entire trans-axial cross-section of the head of the patient 44 regardless of the position of the point source along the arc 48.

Figure 4:
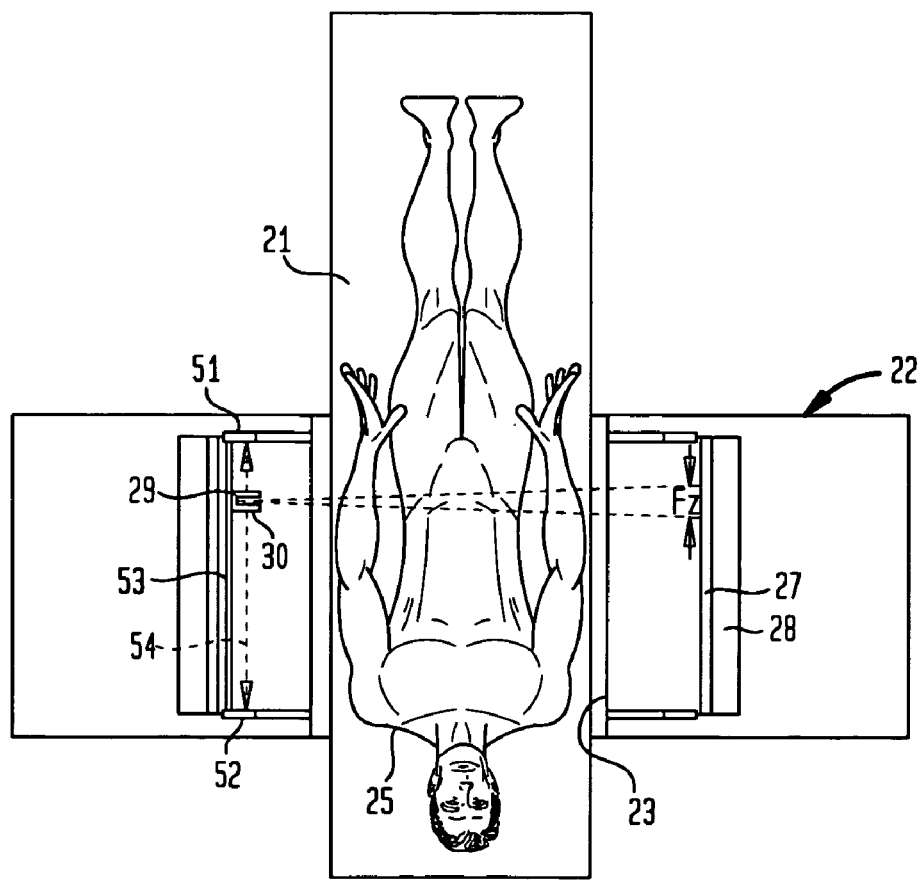
FIG. 4 shows a trans-axial top view of a transmission scan of a human patient using the apparatus of FIG. 1.

FIG. 4 shows a trans-axial top view of the apparatus 20 of FIG. 1 during a transmission scan of the human patient 25. In order to revolve the point source 29 and collimator 30 about the patient 25, the collimator is mounted to a pair of rings 51, 52 that are axially spaced at opposite ends of the scanner assembly 22, and the rings 51, 52 are mounted for rotation about the central axis (24 in FIG. 1). The collimator 30 is mounted for axial translation along a rail 53 spanning the two rings 51, 52. The collimator 30 has a rather narrow beamwidth "Fz" along the axial direction over the opposite scintillation crystal array 27. For example, the beamwidth "Fz" at the scintillation crystal array 27 is much smaller than one-half of the axial length (L) of the field-of-view (FOV) of the scintillation crystal array 27.

Figure 5:
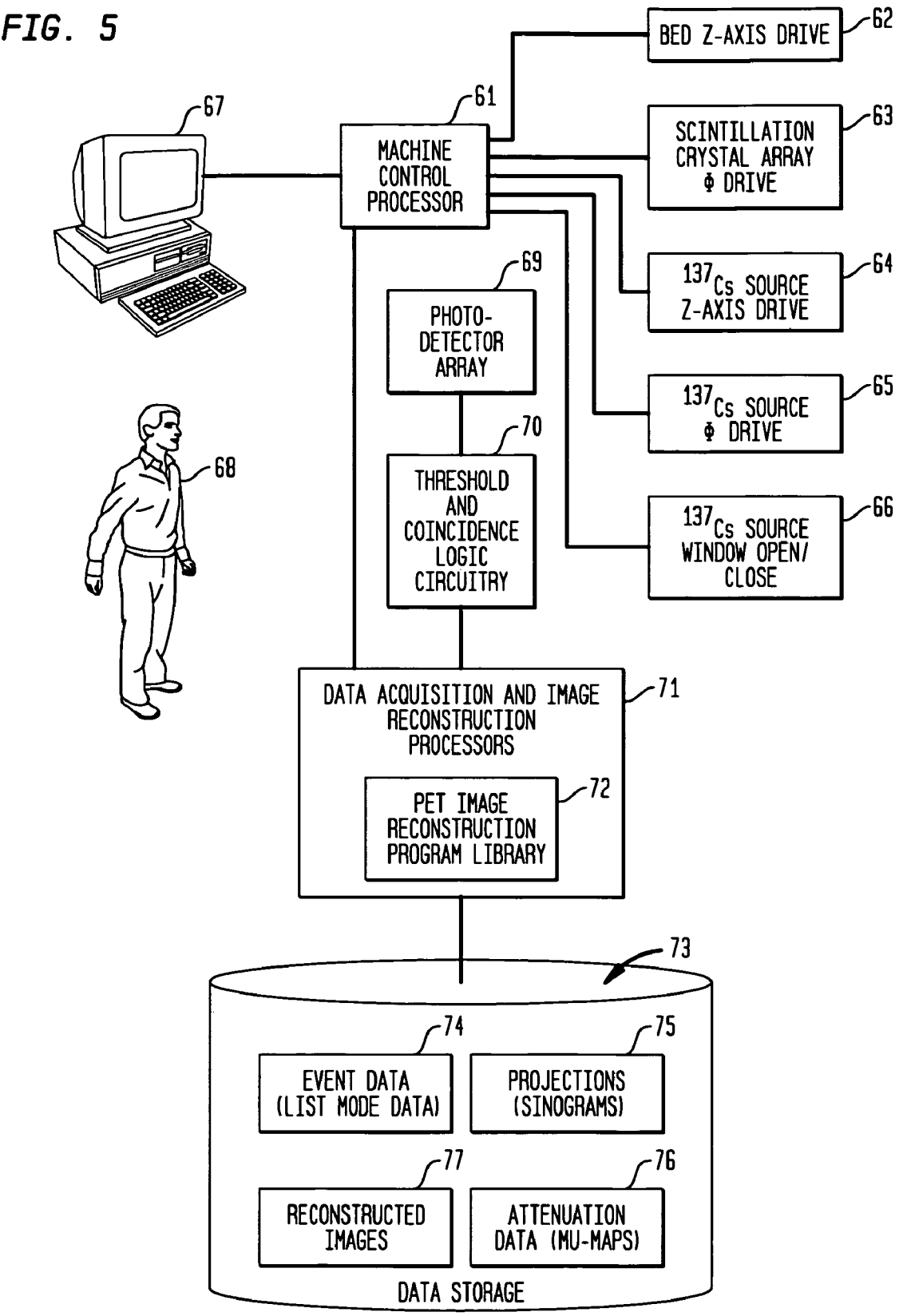
FIG. 5 is a block diagram of a system for nuclear medical imaging using the apparatus of FIG. 1.

FIG. 5 shows a system for nuclear medical imaging using the apparatus of FIG. 1. The system includes a machine control processor 61 for controlling various electro-mechanical drives of the bed and detector assembly of the apparatus of FIG. 1. These drives include a bed Z-axis drive 62 for translating the bed along the z-axis relative to the scanner assembly, a scintillation crystal array Φ drive 63 for adjustment of the scintillation crystal array about the Z-axis, a Cs-137 source Z-axis drive 64 for translating the gamma point source along the axial direction (as shown in FIG. 4), a Cs-137 source Φ drive for revolving the gamma point source in the circumferential direction around the z-axis as shown in FIG. 2, and an actuator 66 for opening and closing the window of the gamma point source. The machine control processor 61 is linked to a terminal 67 of an operator 68 to provide a graphical user interface for receiving commands and displaying reconstructed PET images of the patient.

The machine control processor 61 is also linked to one or more data acquisition and image reconstruction processors 71. Signals from the photo-detector array 69 (including, for example, the photo-detectors 28 in FIG. 2), are received by threshold and coincidence logic circuitry 70. The threshold and coincidence logic circuitry detect and discriminate between single gamma events above an energy threshold, and coincidence gamma events above an energy threshold and coincident within a certain duration of time. In response to detection of a single gamma event, the circuitry 70 transmits to the processors 71 the coordinate indices of the scintillation crystal having been struck by the single gamma photon. In response detection of a coincidence gamma event, the circuitry 70 transmits to the processors 71 the coordinate indices of each of the two scintillation crystals being struck by the coincident gamma photons.

At least one of the data acquisition and image reconstruction processors 71 is programmed for responding to the circuitry 70 for recording in data storage 73 the detected single and/or coincidence gamma events. Preferably the event data 74 are recorded in list mode. Such list mode data 74 are in the form of a list of the events ordered by the time at which each event is detected. This list mode permits the relevant data to be quickly written to the data storage 73 by one of the processors 71 for pipelined processing by other ones of the processors 71 at a later time. The pipelined processing is done by executing programs in a PET image reconstruction program library 72, and includes sorting and binning of the event data into projections 75 such as sinograms, producing attenuation data such as mu-maps from single events recorded during transmission scanning, correcting of the sinogram data of coincidence events for randoms, detector sensitivity, scatter, and attenuation, and producing reconstructed images 77 from the corrected sinogram data of the coincidence events. This pipelined processing typically is done by sequential execution of the programs in the program library 72, although the execution of each program in the sequence could be done in parallel by multiple ones of the processors 71. In a clinical setting, the PET images for a first patient could be reconstructed concurrently with the recording of event data for a second patient.

For a commercial medical image scanner, the program library 72 is typically supplied by the manufacturer of the scanner. For a research scanner, the program library 72 is often available to a registered user group. Moreover, a public domain program library called the "STIR open source reconstruction library" is available from the Internet at stir.irls.org.

Figure 6:
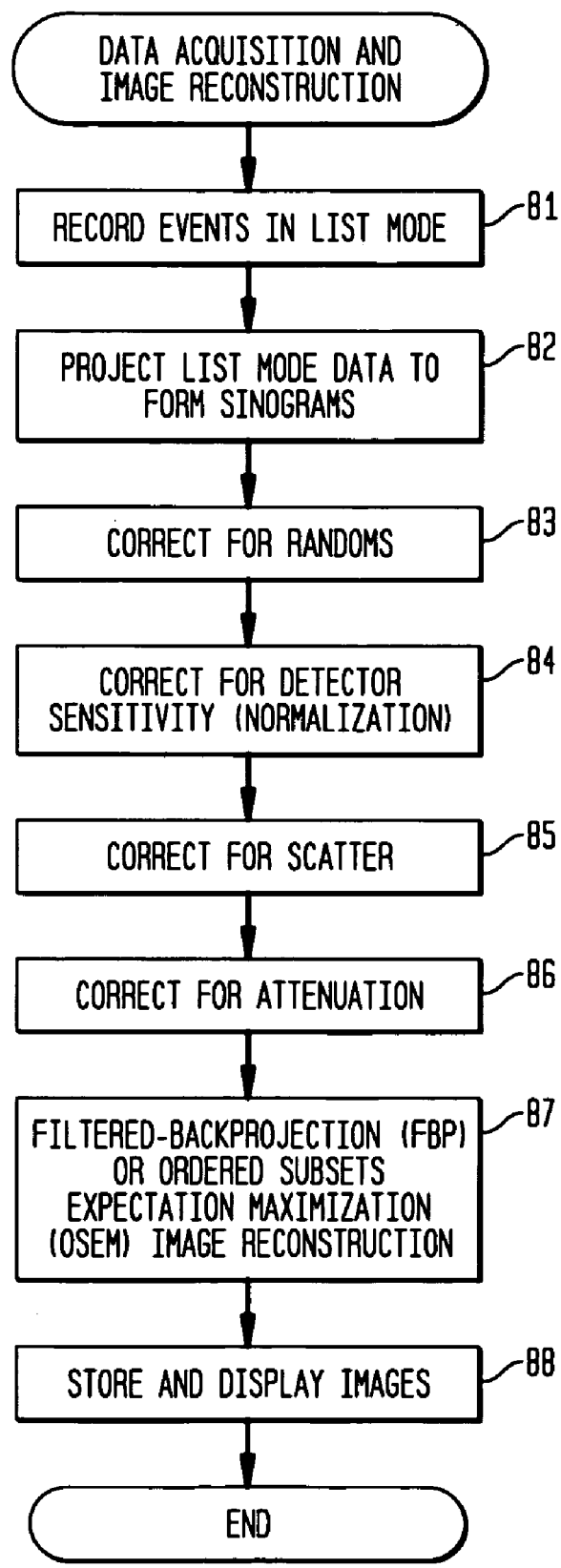
FIG. 6 is a flowchart of a procedure for data acquisition and image reconstruction in the system of FIG. 5.

FIG. 6 shows an example of a general sequence of the event data acquisition and image reconstruction in the system of FIG. 5. In a first step 81 of FIG. 6, event data are obtained by imaging a patient and recording the event data in list mode. Next, in step 82, the list mode data are projected, for example, to form sinograms. In step 83, the projected data are corrected for randoms. In step 84, the projected data are corrected (i.e., normalized) for detector sensitivity. In step 85, the projected data are corrected for scatter. In step 86, the projected data are corrected for attenuation. In step 87, images are reconstructed from the projected data, for example by a process of filtered-back-projection (FBP) or a process of ordered subsets expectation maximization (OSEM). Finally, in step 88, the reconstructed images are stored and displayed, for example, during the diagnosis and treatment of the patient for a disease such as cancer.

The present invention more particularly concerns the estimation of emission contamination of a transmission scan. Typically an estimate of emission contamination is based on a real mock scan (i.e., an additional transmission scan without the gamma point source being exposed). Such a real mock scan, however, may be clinically unpractical since it may require additional scan time of about 5 minutes or more. Another possible method, the estimation of emission contamination based on phantoms after uniform or non-uniform scaling, is also undesirable for implementation at the clinical level. What is desired is a method of estimation of emission contamination that does not involve additional time for acquisition of list-mode data and that is sufficiently robust and general to be implemented at clinical level.

In accordance with a basic aspect of the present invention, an estimate of the emission contamination is obtained from shifted-mock scan data taken simultaneously with transmission scan data. In a preferred implementation, the shifted-mock scan uses pseudo-coincidence data from a virtual point source shifted in the axial direction from the real gamma point source by about half the axial field-of-view (FOV).

Figure 7:
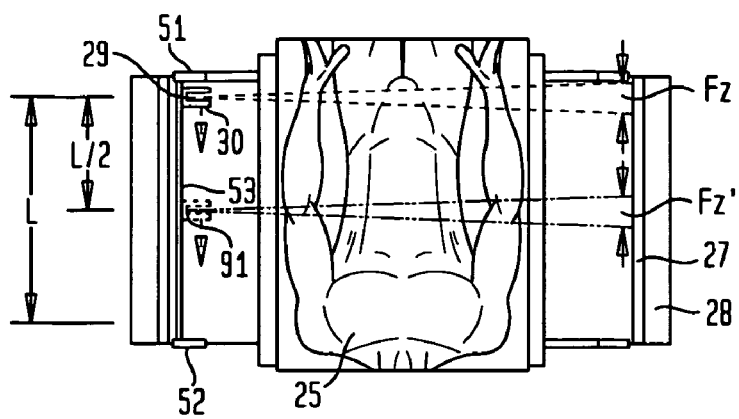
FIGS. 7 to 10 show successive locations of a virtual point source relative to a real gamma point source during a shifted mock scan.

FIGS. 7 to 10 show successive locations of a virtual point source 91 relative to a real gamma point source 29 during a shifted mock scan. In FIG. 7, the real point source 29 is at an extreme axial position next to the ring 51, and the virtual point source 91 is axially displaced from the real point source by a distance of L/2, where L is the axial FOV, and the virtual point source appears between the real point source and the ring 52.

Figure 8:
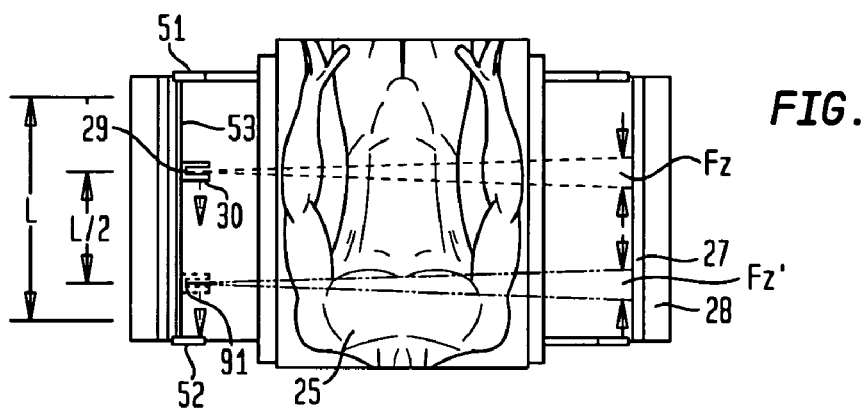

In FIG. 8, the real point source 29 has moved axially away from the ring 51 by about (0.35)L, and the virtual point source is displaced axially from the ring 51 by L/2 and appears between the real point source and the ring 52.

Figure 9:
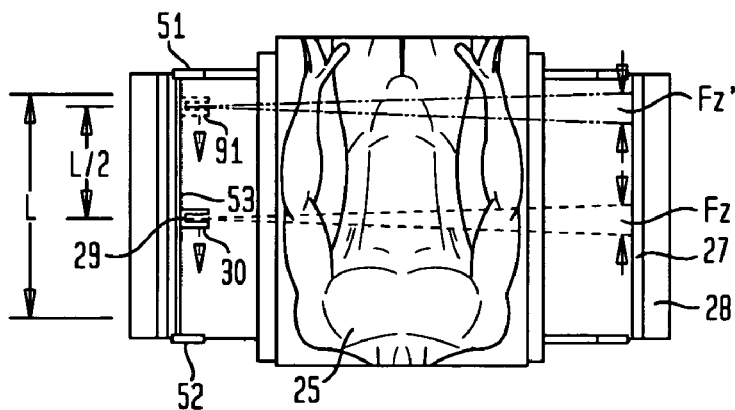

In FIG. 9, the real point source 29 has moved axially away from the ring 51 by about (0.55)L, and the virtual point source is axially displaced by L/2 from the real point source and is between the ring 51 and the real point source.

Figure 10:
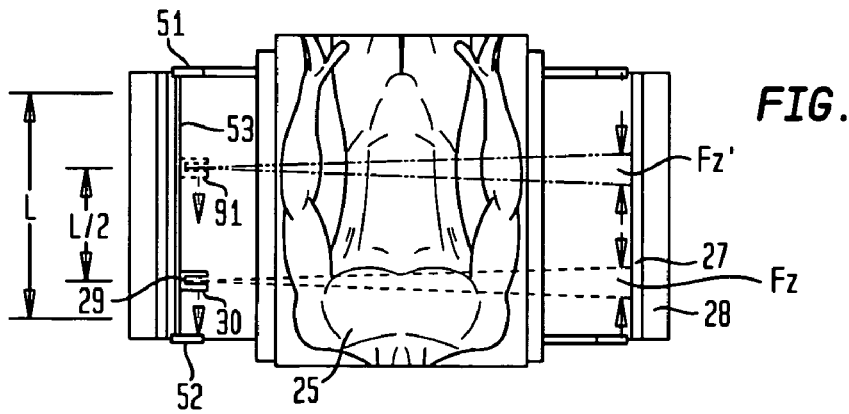

In FIG. 10, the real point source 29 has moved axially away from the ring 51 by about (0.80)L from the ring 51, and the virtual point source 91 is axially displaced by L/2 from the real point source and is between the ring 51 and the real point source.

Figure 11:
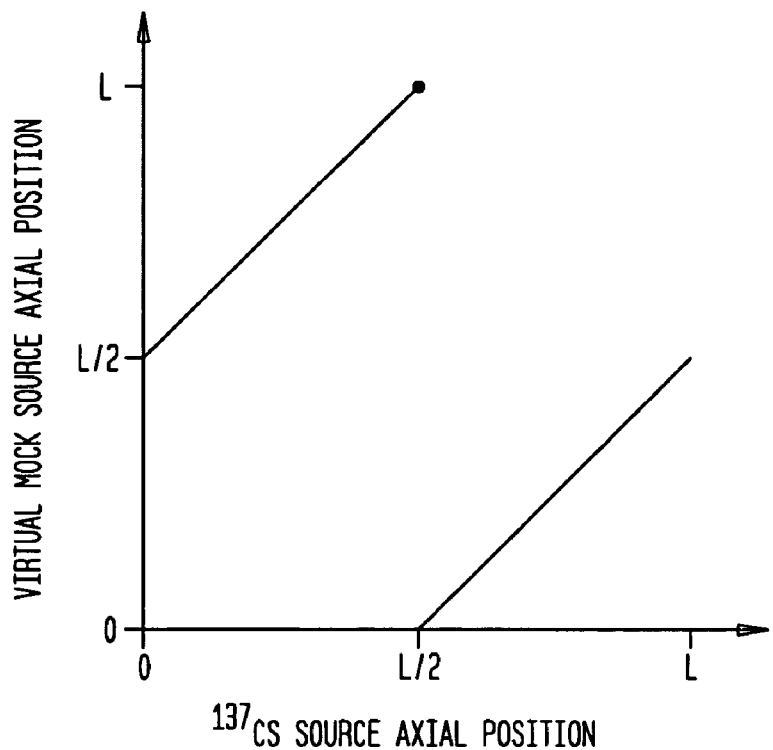
FIG. 11 shows a graph of the virtual mock source axial position as a function of the real gamma point source axial position during the shifted mock scan of FIGS. 7 to 10.

FIG. 11 shows a graph of the virtual mock source axial position (i.e., the axial position of the virtual point source 91 in FIGS. 7-10) as a function of the point source axial position (i.e., the axial position of the real point source 29 in FIGS. 7-10) during the shifted mock scan of FIGS. 7 to 10. There is a discontinuity in the position of the virtual mock source axial position when the point source is at the axial midpoint of the FOV. The virtual mock source axial position as a function of the point source axial position, for example, could be calculated by the following computer program:

```
IF (RealPSAxialPosition < L/2) THEN {
    VirtualPSAxialPosition = RealPSAxialPosition + L/2 }
                    ELSE {
    VirtualPSAxialPosition = RealPSAxialPosition – L/2 }
```

It should be understood that the virtual mock source 91 in FIGS. 7 to 10 is merely a schematic representation of a process of collecting relevant EC data over a region of the scintillation crystal array 27 having an axial extent designated "Fz'" that is axially separated from the region illuminated by the beamwidth "Fz" of the real point source. This relevant EC data are then used for correcting transmission scan data that are collected by the scintillation crystal array 27 over the same region, in response to the real point source 29. In a specific implementation, the relevant EC data are collected over the axial extent designated "Fz'" of the scintillation crystal array 27 in the same way that the relevant transmission scan data are collected over the axial extent "Fz" so that the relevant EC data are used for correcting the transmission scan data by subtracting this EC data from the transmission scan data that are collected over the axial extent "Fz" of the scintillation crystal array.

In practice, for maximizing the "signal to noise" ratio of the transmission scanning process, the axial extent of the scintillation crystal array over which the transmission scan data are collected from the real point source 29 is matched to the axial beamwidth "Fz" over the gamma detector of the gamma radiation from the real point source. It should be understood that the axial extent of the scintillation crystal array over which the transmission scan data are collected from the real point source 29 is defined by the software or programming of the data acquisition and image reconstruction processors (71 in FIG. 5), and the beamwidth "Fz" of the gamma radiation from the real point source 29 is defined by the physical construction and arrangement of the real point source and the collimator 30.

Figure 12:
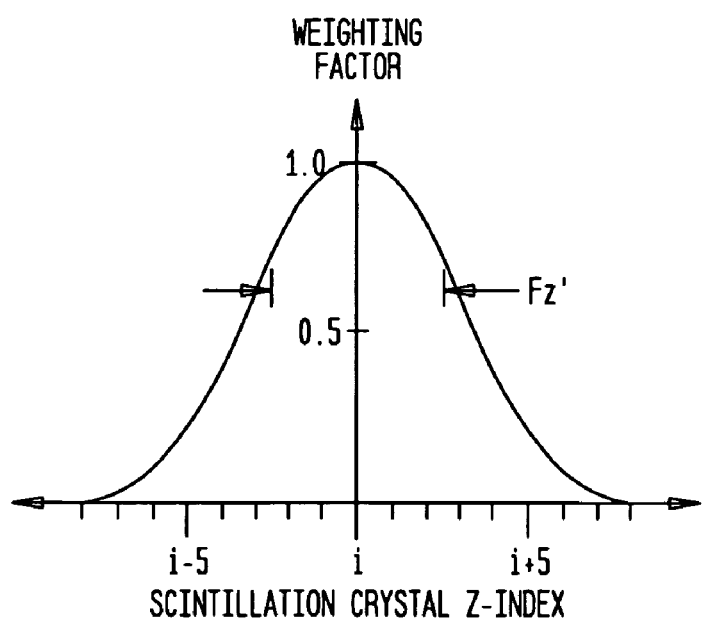
FIG. 12 shows a window function defining a beamwidth of a virtual mock scan.

For example, as shown in FIG. 12, a window function providing a weighting factor is plotted as a function of the z-index of the scintillation crystal z-index. The EC data could be collected over an axial extent "Fz'" as shown in FIG. 12 by multiplying the number of single events collected at each crystal by a respective weighting factor for each crystal index, and summing all of the products. The respective weighting factor is given by a predetermined window function. This should be recognized as a kind of digital filtering process; namely, a transversal filter. The window function typically used for such a digital filtering process is a raised cosine or Gaussian function as shown in FIG. 12. However, a rectangular window is often used in order to simplify the calculations.

Typically the kind of digital filtering process introduced with respect to FIG. 12 is built into programs of the program library that involve projection. Thus, the shifted mock scan can be performed by repeating the invocation of the program for the collection of the transmission scan data with a substitution of the virtual mock source axial position for the real source axial position. This will result in the collection of EC data that can be directly subtracted from the collected transmission scan data.

It is also possible to use programs for projecting coincidence event data for producing the transmission scan and the shifted mock scan. This is done by generating pseudo-coincidence events, each using the crystal address of the detection of a single gamma event, and the real gamma point source location (for producing the transmission scan) or the virtual point source location (for projecting the shifted mock scan). The pseudo-coincident events are recorded in list mode format, and the pseudo-coincident events in list mode format are used as input to a projection program normally used for projecting coincidence event data. In this case, the list mode data could be recorded in three separate files, including a first file of pseudo-coincident events using the real gamma point source location, a second file of pseudo-coincident events using the virtual point source location, and a third file of real coincidence event data. Event data from the first file are projected to form the transmission scan, event data from the second file are projected to form the shifted mock scan, and event data from the third file are projected to form the PET scan.

In a preferred implementation, the transmission scan single event data over at least the axial extent "Fz" and "Fz'" scintillation crystal array are collected simultaneously in list mode format, and then this transmission list mode data are sorted into two parallel projections using nearest neighbor (NN) approximation, one projection being centered about the axial position of the real point source, and the other projection being centered about the axial position of the virtual point source. The projections, for example, result in a sinogram for the axial position of the real point source containing the transmission data, and a sinogram for the axial position of the virtual point source containing the EC data. Since these two scans have the same duration and rebinning dwell (due to the NN approximation) they are directly subtracted in order to correct the transmission scan data for the EC.

Figure 13:
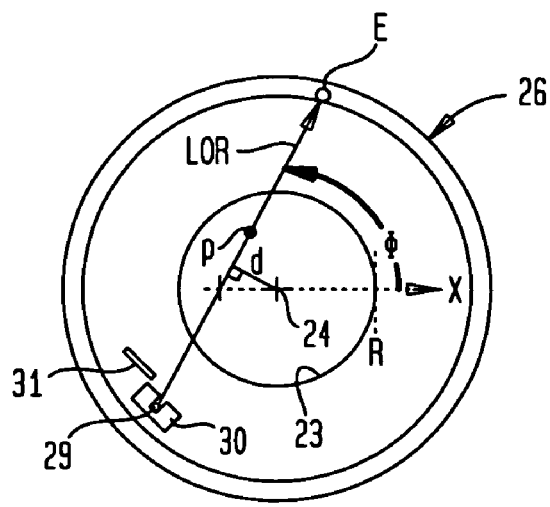
FIG. 13 is a schematic diagram showing an angle (Φ) and trans-axial displacement (d) with respect to a line of response (LOR) for a single gamma event detected by the scanner of FIG. 1.

The process of projecting the event data into a sinogram maps each possible line-of-response (LOR) to a respective cell or bin in the sinogram. Thus the process of sorting and binning counts any multiple occurrences of similar events so that the sinogram is a kind of histogram. The mapping of a LOR to a particular bin in the sinogram is evident from a comparison of FIG. 13 to FIG. 14. The LOR is defined by a point of origin (the real point source 29) and a point of destination (the location of the scintillation crystal at which the event E is detected). The angle between the ray of the LOR and the X-axis (i.e., the horizontal trans-axial direction) is denoted by the angle $\Phi$, and the displacement of the LOR from the axis 24 is denoted by "d". The displacement "d" can be defined more precisely as the abscissa of the center point 24 once the X-Y plane (where Y is the vertical trans-axial direction) has been rotated by the angle $\Phi$ and translated to the point of intersection of the LOR and the X-axis.

Figure 14:
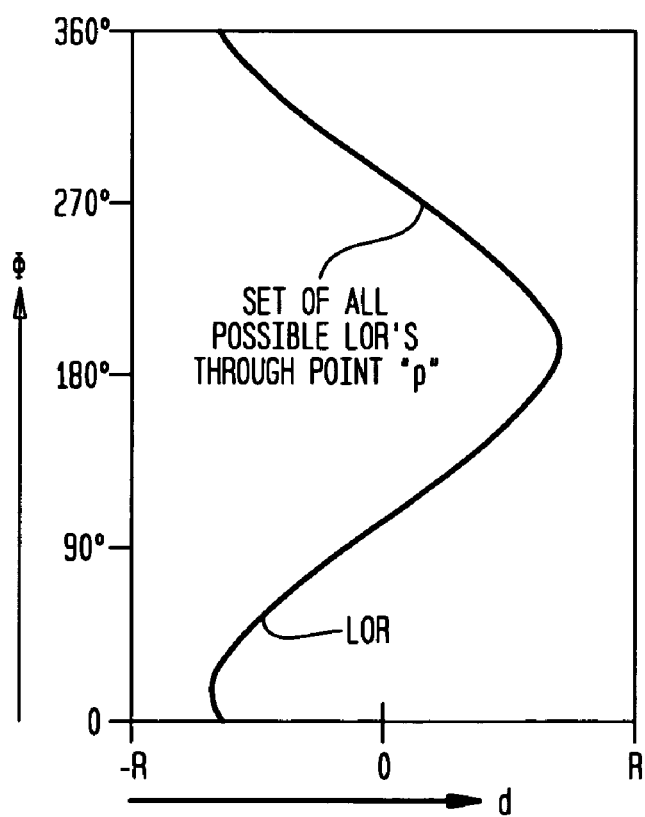
FIG. 14 is a sinogram having a particular point corresponding to the LOR shown in FIG. 13.

As shown in FIG. 14, the sinogram is a region formed by plotting the angle $\Phi$ over a range of 0 to 360 degrees versus the displacement d over a range of –R to R, where R is the radius of the hole 23 in the scanner assembly. Each possible LOR through the hole 23 in the scanner assembly corresponds to a point or cell in the sinogram. The loci of all possible LORs through a point "p" in the hole 24 form a sine wave in the sinogram (with the sole exception that the center point 24 on the z-axis is a vertical line bisecting the plane of the sinogram).

Figure 15:
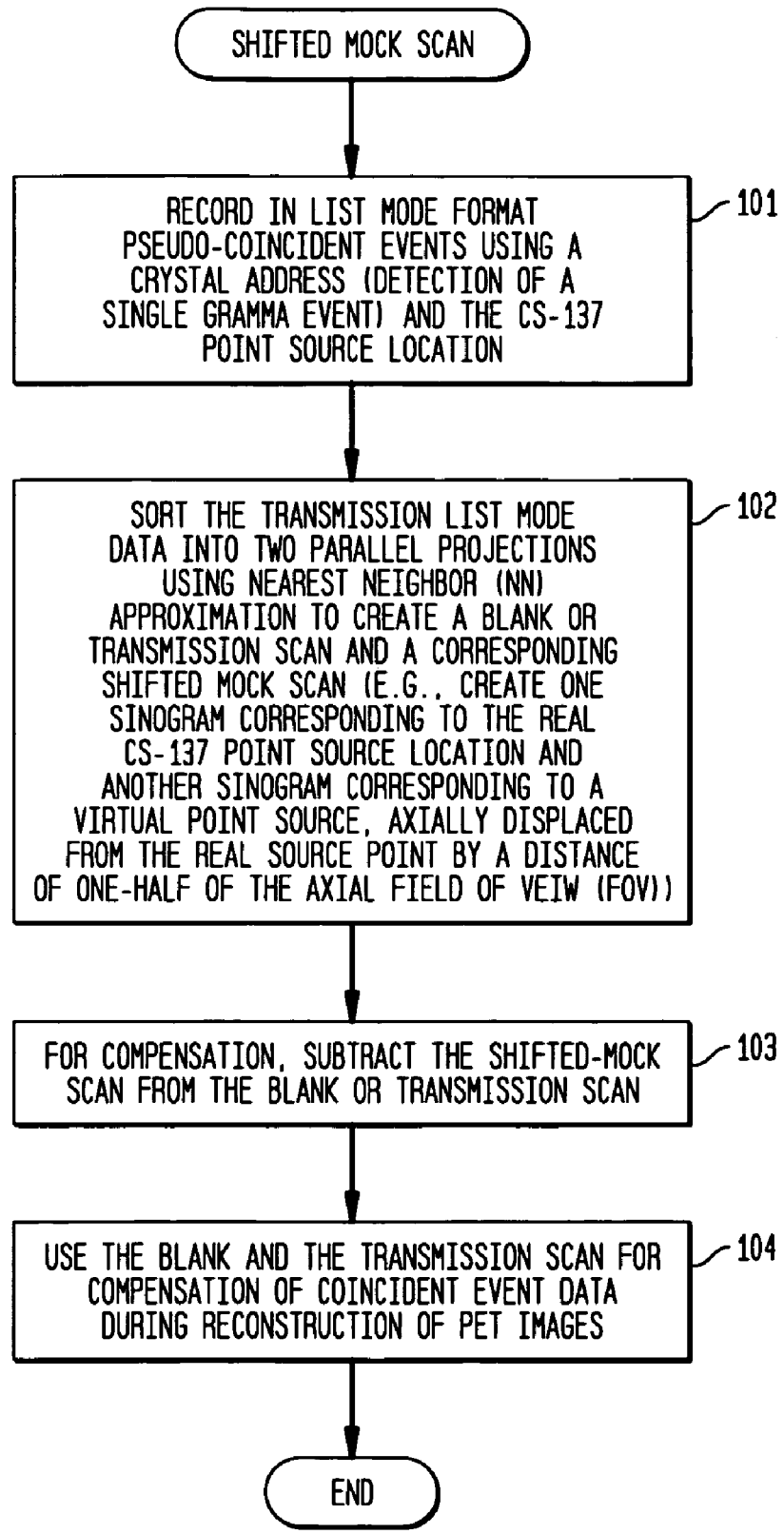
FIG. 15 is a flowchart of a procedure for using the shifted mock scan of FIGS. 7-10 for compensation of coincident event data.

FIG. 15 shows a procedure for using the shifted mock scan of FIGS. 7-10 for compensation of coincident event data. In a first step 101, pseudo-coincident events are recorded in list mode format using a crystal address (detection of a single gamma event) and the point source location. In step 102, the transmission list mode data are sorted into two parallel projections using nearest neighbor (NN) approximation to create a blank scan or a transmission scan and a corresponding shifted mock scan. In this context a blank scan is a scan with the point source cover open and the patient absent from the scanner. The transmission scan is a scan with the point source open and the patient preset in the scanner. A shifted-mock blank scan can be build using singles from the point source eventually scattered in the collimator and singles from background (such as radiation emitted from the scintillation crystals themselves). A shifted-mock (hot) transmission scan can be built using singles from the point source transmitted through the emitting object (such as the patient) and eventually scattered in the collimator and the object, singles and scattered singles from the emitting object, and singles from background (such as radiation emitted from the scintillation crystals themselves).

Preferably the transmission list mode data are projected into sinograms. One sinogram is created corresponding to the real point source location and another sinogram is created corresponding to a virtual point source, axially displaced from the real source point by a distance of one-half of the field of view (FOV). In step 103, for compensation, the shifted-mock scan (containing EC data) is subtracted from the corresponding blank or transmission scan. Finally, in step 104, the blank and the transmission scan (corrected by shifted mock scan) are used for compensation of coincident event data during reconstruction of PET images. For example, the transmission scan data, compensated for EC, is used to form a mu-map of the patient, and the mu-map is used for attenuation correction of the PET sinograms prior to PET image reconstruction.

The shifted mock scan method as described above has been validated against both real mock scan and cold transmission for the High Resolution Research Tomograph (HRRT), which is a brain-dedicated scanner manufactured by Siemens. The results of the validation have been published in M. Sibomana et al., "Simultaneous measurement of transmission and emission contamination using a collimated $Cs^{137}$ point source for the HRRT," Nuclear Science Symposium Conference Record, 16-22, Oct. 2004, IEEE, Vol. 4 pages 2647-2651. The HRRT has a scanning geometry as described above with reference to FIG. 3. The shifted mock scan subtraction accounted for both EC and transmission scatter so that it also improved cold transmission. The best results were however obtained when mock scan subtraction was combined with partial segmentation as implemented in the MAP-TR program for the HRRT.

The MAP-TR program incorporates smoothness and optional intensity priors. It is further described in J. Nuyts et al., "Evaluation of Maximum-Likelihood based attenuation correction in positron emission tomography," IEEE Trans. Nucl. Sci., vol. 46, pp. 1136-1141, August 1999. Intensity prior assumed that the mu-histogram was a sum of Gaussian with user defined mean, variance and class boundaries, a hypothesis that has been checked on patient and phantom studies. When using intensity prior, partial segmentation was achieved by sharpening only two classes: noise and soft tissue. The other classes were not segmented (they were given a large variance) since the mu-value from materials such as head support and contention material, bone and dental filling were generally unknown or could vary for different subjects. The number of classes varied from two for simple phantoms to four for patient studies. All mu-map reconstruction used ten iterations and eight subsets. Intensity prior when used, was switched on at the fifth iteration.

Local residual bias in the mu-map was attributed to transmission scatter and corrected by using partial segmentation in the MAP-TR program for the HRRT. Partial segmentation solved the problem of residual scatter in both cold and hot transmission. It also reduced the noise and bias in the mu-map and in their corresponding attenuation correction. This improved the quality of both scatter estimation and final emission image. The μ-map conversion from 662 to 511 keV was performed automatically by linear scaling on a specified class of the histogram when requested. 3D attenuation correction was obtained by forward projecting the μ-map at 511 keV, using inverse Fourier rebinning when calculating the oblique attenuation segments.

The shifted-mock scan technique was validated by comparing it to a real mock scan with a Ge-68 phantom and examined its effectiveness with a hot 20 cm phantom filled with F-18 decaying over several half-lives. 1.2 mCi of Ge-68 was used to validate the shifted-mock scan technique against the real mock scan (physically removing the Cs-137 point source). As was done with the shifted-mock scans, real mock scans were subtracted from the uncorrected scans for both blank and transmission. A decaying phantom initially loaded with 2.0 mCi F-18 was used to assess the quality of the emission contamination correction. The cylindrical phantom (20 cm diameter) had a small cylindrical compartment filled with air. Blank, hot and cold transmission data were acquired in fourteen frames for 6.5 h using two energy windows: 550-800 keV and 600-800 keV. These data were used to determine the best energy window.

Mu-maps from cold and hot transmissions were compared on several clinical patients and a Hoffman brain phantom for which their influence on emission quantification was studied. Five patients were scanned for transmission pre- and post-injection using $^{18}$FDG and $^{18}$FDOPA clinical protocols in Koln, Germany (Max Planck Institute for Neurological Research). Additional cold transmission data on patients were also available. These data were used (i) to validate the cold mu-map reconstruction with MAP-TR (ii) to determine robust (and possibly common) parameters for partial segmentation in both hot and cold cases and (iii) to test the quality of the emission contamination correction by comparing hot and cold mu-maps before and after partial segmentation. The assessment was purely visual, and included checking (i) for the occurrence of unphysical isolated low mu pockets in the water compartment, (ii) that the shape and thickness of the skull was compatible with the contaminated mu-map, and (iii) attempting to recover most air cavities. No distance measurement between the maps was used since it could not be guaranteed that the patient had not slightly moved.

The influence of the contamination correction on quantitative emission was examined with a Hoffman brain phantom containing 2.1 mCi $^{18}$FDG. Hot transmissions (before and after the one hour emission protocol) and cold (the next day) transmission were acquired. This procedure ensured perfect registration between hot and cold transmissions. Emission data were reconstructed with 16 subsets and 10 iterations using Ordinary Poisson (OP-) OSEM3D and either hot or cold attenuation data. Scatter was also estimated using either the cold or the hot mu-map. Emission images were saved at each iteration and post-smoothed with a 2 mm Gaussian filter. Regions of interest (ROI's) were drawn in each compartment of the phantom (grey matter, white matter and ventricle). For each ROI, Iteration Activity Curves (IAC's) were calculated to ensure the convergence of the mean value.

The contaminated μ-map for the uniform phantom loaded with 1.2 mCi of Ge-68 showed the large amplitude of the EC. In this particular case, the local bias could be corrected with segmentation. The mu-maps were reconstructed without intensity prior, in this case. Both mock scan correction techniques are about equivalent and still produce locally biased mu-maps. The local bias was attributed to residual scatter and could not be compensated by global scaling. The bias needs to be corrected to avoid its propagation into both scatter estimation and reconstructed emission data.

Figure 16:
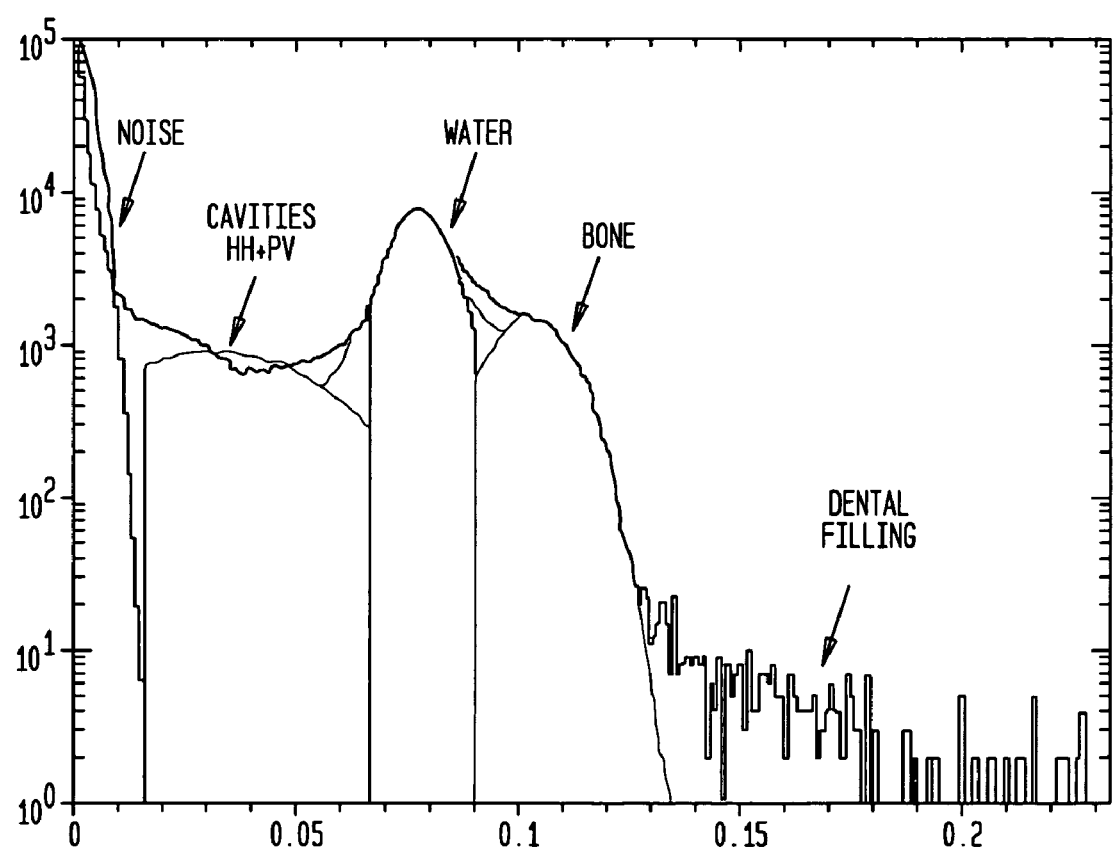
FIG. 16 is a mu-histogram for a cold brain (before 511 keV scaling) superimposed with a four Gaussian model.

As can be seen in FIG. 16, a four Gaussian class model provides a realistic description of the attenuation (mu) distribution for a cold head (upper curve). Three inter-class boundaries are also shown which are used to split the classes during reconstruction. Partial segmentation sharpened the histogram for two classes only (noise and water) within their boundaries leaving other classes, unmodified. The second class includes head holder (HH), air cavities and all voxels with partial volume effect (PV), composed from both air and water. The segmentation of the air cavities was not exact (e.g. in the region of the trachea) but bone and tooth filling appearance looked identical. The partial segmentation overcomes the slight bias from residual scatter. The use of a segmented attenuation generally reduces the noise in the emission image.

Figure 17:
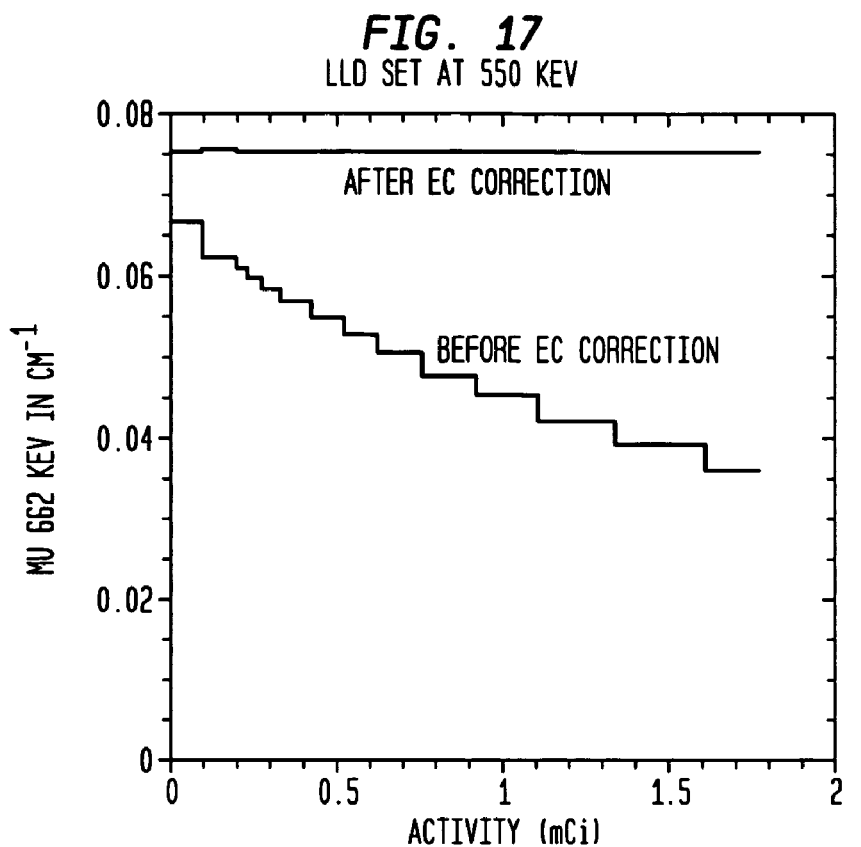
FIG. 17 is a graph of the mean attenuation (mu) value in a large volume of interest before and after correction for emission contamination for a lower level discriminator setting of 550 keV.
Figure 18:
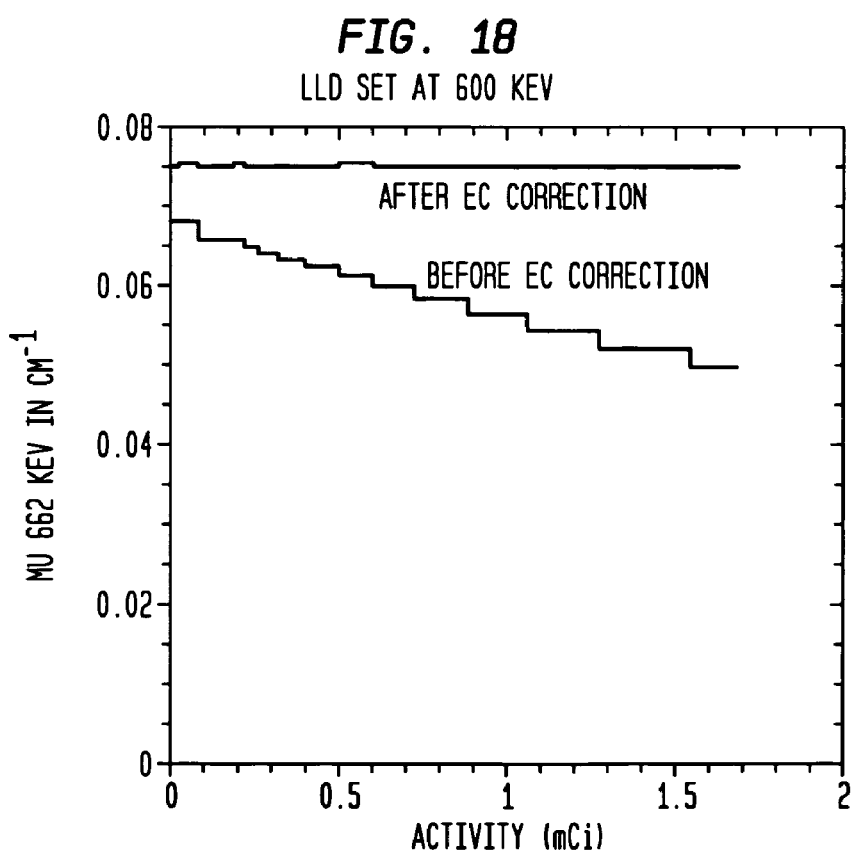
FIG. 18 is a graph of the mean attenuation (mu) value in the large volume of interest before and after correction for emission contamination for a lower level discriminator setting of 600 keV.

FIGS. 17 and 18 show how the bias in the mu-map at 662 keV (i.e. before resealing) increases with EC for with the lower level discriminator (LLD) set at 550 keV (FIG. 17) and 600 keV (FIG. 18). The bias was estimated using the mean µ in a large volume of interest inside the phantom for all frames in both contaminated and segmented µ-maps at 662 keV. It was observed that (i) the cold transmission is also affected by the shifted-mock processing and (ii) the bias is smaller when LLD is set at 600 keV. As long as the mu-map could be properly segmented at 550 keV, they benefit from higher statistics. One should note that shifted-mock correction alone (i.e. no segmentation) still produces a biased mu-map.

The contaminating residual FDG activity during the hot transmission was estimated at 1 mCi. Hot transmission data were generally noisier and required stronger spatial regularization than cold transmission. The boundary between air and water classes was also lowered to avoid occurrence of unphysical low mu regions inside the water compartment. The use of common parameters for segmenting cold and hot transmissions may well be suboptimal, but resolution of this issue would require further investigation. The mu-map quality assessment was purely visual since the cold un-segmented µ-map was likely affected by residual scatter and could not be considered as the true mu-map. Moreover the patient could have slightly moved. Both unsegmented maps were not uniform in the water compartment so partial segmentation was necessary in both cases to compensate for residual scatter. If partial segmentation is preferable for large objects, such as human heads or large phantoms, it may not be the case for small animal studies. This could be investigated by comparing cold mu-map obtained with MAP-TR to a mu-map derived from CT.

Three planes of the Hoffman brain phantom were used to define six ROIs in grey, white matter and ventricles, and Iteration Activity Curves were produced for these six ROIs including continuous lines resulting from reconstructing emission image with OP-OSEM (10 iterations with 16 subsets) using the cold attenuation and including open symbols result from using the hot attenuation. In both cases the attenuation was obtained by forward projecting the segmented µ-map and the scatter was estimated in each case using the corresponding µ-map. Cold and hot results were found to superimpose at all iterations. IACs were calculated to investigate the fact that GM/WM/Ventricle was not strictly 4/1/0 as expected. This analysis shows that the discrepancy could not be attributed to hot attenuation processing or lack of convergence but may be related to scatter overcorrection, and/or partial volume effect since HRRT has a high axial resolution. The quality control on the preprocessing is not sensitive enough to exclude scatter overcorrection.

In view of the above, there has been described a method of performing a shifted mock scan to collect emission contamination (EC) data simultaneous with the collection of transmission data during a transmission scan of a patient with a collimated gamma point source, correcting the transmission data with the emission contamination data, and using the corrected transmission data for attenuation correction of emission data for reconstruction of an emission image of the patient. Thus, in a PET imaging apparatus, the transmission scan of the patient may be performed at the same time as the emission scan of the patient. In a preferred implementation, when the point source is at a particular axial location and illuminates an axial beamwidth of "Fz" over the gamma detector, emission contamination data are collected from the gamma detector over an axial separated region "Fz'" having about the same axial extent but axially displaced by about half of the axial field of view (FOV). The shifted mock scan method has been validated on the High Resolution Research Tomograph (HRRT). The HRRT is a brain-dedicated scanner manufactured by CPS Innovations using LSO panel detectors. In the HRRT, transmission is measured using a Cs-137 point source, which is moved axially and rotated to cover the FOV. The point source is collimated axially and trans-axially to illuminate only a few planes on the gamma detector heads opposite to the point source location.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A computer implemented method of performing a transmission scan of a patient while the patient is emitting radiation, and correcting the transmission scan for emission contamination from the patient, the method comprising:

transmitting gamma rays into the patient from a collimated point source, and moving the collimated point source axially and circumferentially with respect to the patient, while detecting at a gamma detector gamma rays transmitted from the collimated point source through the patient and gamma rays emitted from the patient;

sorting gamma ray detection events from the gamma detector into transmission events detected over an axial beamwidth of the collimated point source over the gamma detector and emission contamination events detected is over an axial region of the gamma detector axially separated and axially displaced from the axial beamwidth of the collimated point source over the gamma detector; and correcting the transmission events detected over the axial beamwidth of the collimated point source over the gamma detector with the emission contamination events detected over the axial region of the gamma detector axially separated and axially displaced from the axial beamwidth of the collimated point source over the gamma detector.

2. The method as claimed in claim 1, which includes recording gamma detection events from the gamma detector in list mode format, and the sorting of the gamma ray detection events from the gamma detector is performed by projecting the recorded gamma detection events into two parallel projections, one for the transmission events and the other for the emission contamination events.

3. The method as claimed in claim 2, wherein the transmission events are corrected with the emission contamination events by subtracting the parallel projection for the emission contamination events from the parallel projection for the transmission events.

4. The method as claimed in claim 1, wherein the gamma detector has an axial field of view, and the axial region of the gamma detector is axially separated from the axial beamwidth of the collimated point source over the gamma detector by about half of the axial field of view while the collimated point source is moved axially and circumferentially with respect to the patient.

5. The method as claimed in claim 1, wherein the patient contains a positron-emitting isotope during the transmission scan, and the method includes recording gamma events caused by said collimated point source as transmission events, and recording gamma events caused by said positron-emitting isotope as emission contamination events, and the method includes using the corrected transmission events for performing an attenuation correction upon recorded coincidence gamma detection events for reconstruction of an emission image of the patient.

6. A computer implemented method of nuclear medical imaging, said method comprising the steps of:
    collecting transmission data of a transmission scan of a patient with a collimated gamma point source, the transmission data resulting from detection of gamma events over a beamwidth of the collimated gamma point source over a gamma detector of a nuclear medicine scanner while the gamma detector is also detecting gamma rays emitted by the patient;
    collecting emission contamination data of a shifted mock scan during the transmission scan of the patient, the emission contamination data of the shifted mock scan resulting from detection of gamma events over a region of the gamma detector separated from the beamwidth of the collimated gamma point source over the gamma detector;
    correcting the transmission data of the transmission scan of the patient with the emission contamination data of the shifted mock scan, and
    using the corrected transmission data of the transmission scan of the patient for reconstruction of an emission image of the patient.

7. The method as claimed in claim 6, wherein the collimated gamma point source is moved axially and circumferentially with respect to the patient during the transmission scan of the patient, the gamma detector has an axial field of view, and the region of the gamma detector is axially displaced by about one half of the axial field of view from the beamwidth of the collimated gamma point source over the gamma detector.

8. The method as claimed in claim 6, which further includes collecting emission contamination data in a shifted mock scan simultaneous with collection of transmission data during a blank transmission scan in the nuclear medicine scanner when the patient is absent from the nuclear medicine scanner, and correcting the transmission data of the blank transmission scan with the emission contamination data of the shifted mock scan collected simultaneously with the blank transmission scan.

9. The method as claimed in claim 6, wherein the reconstructed image of the patient is an image reconstructed from emission data from an emission scan of the patient, and the corrected transmission data of the transmission scan of the patient is used for reconstruction of the image of the patient by attenuation correction of the emission data from the emission scan.

10. The method as claimed in claim 6, wherein the nuclear medicine scanner is a positron-emission tomography scanner, the patient contains a positron-emitting isotope, and the method includes detecting single gamma events to produce the transmission scan data and the emission contamination data, and detecting coincidence gamma events to produce the emission scan data.

11. The method as claimed in claim 6, wherein the collecting of the transmission data of the transmission scan and the collecting of the emission contamination data of the shifted mock scan includes recording event data from the gamma detector and sorting the recorded event data into two parallel projections to produce the transmission data in one of the parallel projections and the emission contamination data in the other of the parallel projections, and the two parallel projections are displaced from each other along an axial direction of the nuclear medicine scanner.

12. The method as claimed in claim 6, which includes displaying the emission image of the patient for diagnosis or treatment of disease.

13. A nuclear medical imaging system comprising:
    a detector assembly including a gamma detector mounted for being circumferentially disposed about a patient, and a collimated gamma point source mounted for axial and circumferential movement with respect to the patient, and
    at least one data processor coupled to the gamma detector and programmed for sorting gamma ray detection events from the gamma detector into transmission events detected over an axial beamwidth of the collimated point source over the gamma detector and emission contamination events detected over an axial region of the gamma detector axially separated and axially displaced from the axial beamwidth of the collimated point source over the gamma detector, and for correcting the transmission events detected over the axial beamwidth of the collimated point source over the gamma detector with the emission contamination events detected over the axial region of the gamma detector.

14. The system as claimed in claim 13, wherein said at least one data processor is programmed for recording gamma detection events from the gamma detector in list mode format, and for performing the sorting of the gamma ray detection events from the gamma detector by projecting the recorded gamma detection events into two parallel projections, one for the transmission events and the other for the emission contamination events.

15. The system as claimed in claim 14, wherein said at least one data processor is programmed for correcting the transmission events with the emission contamination events by subtracting the parallel projection for the emission contamination events from the parallel projection for the transmission events.

16. The system as claimed in claim 13, wherein the gamma detector has an axial field of view, and said at least one data processor is programmed so that the axial region of the gamma detector is axially separated from the axial beamwidth of the collimated point source over the gamma detector by about half of the axial field of view while the collimated point source is moved axially and circumferentially with respect to the patient.

17. The system as claimed in claim 13, wherein the system includes coincidence logic circuitry connected between the gamma detector and said at least one data processor for discriminating between single and coincidence gamma detection events from the gamma detector, said at least one data processor is programmed for selecting the transmission events and the emission contamination events from the single gamma detection events, and said at least one processor is programmed for using the corrected transmission events for performing an attenuation correction upon coincidence gamma detection events during reconstruction of an emission image of the patient from coincidence gamma detection events obtained during an emission scan of the patient.

18. A nuclear medical imaging system comprising:
a scanner assembly including a gamma detector mounted for being circumferentially disposed about a patient, and a collimated gamma point source mounted for axial movement with respect to the patient, and
at least one data processor coupled to the gamma detector and programmed for:
collecting transmission data of a transmission scan of a patient with the collimated gamma point source, the transmission data resulting from detection of gamma events over a beamwidth of the collimated gamma point source over the gamma detector;
collecting emission contamination data of a shifted mock scan during the transmission scan of the patient, the emission contamination data of the shifted mock scan resulting from detection of gamma events over a region of the gamma detector separated from the beamwidth of the collimated gamma point source;
correcting the transmission data of the transmission scan of the patient with the emission contamination data of the shifted mock scan of the patient, and
using the corrected transmission data of the transmission scan of the patient for reconstruction of an emission image of the patient.

19. The system as claimed in claim 18, wherein the collimated gamma point source is mounted for circumferential as well as axial movement with respect to the patient during the transmission scan of the patient, the gamma detector has an axial field of view, and said at least one data processor is programmed so that the region of the gamma detector is axially displaced by about one half of the axial field of view from the beamwidth of the collimated gamma point source over the gamma detector.

20. The system as claimed in claim 18, wherein said at least one data processor is programmed for collecting emission contamination data in a shifted mock scan simultaneous with collection of transmission data during a blank transmission scan when the patient is absent from the scanner assembly, and correcting the transmission data of the blank transmission scan with the emission contamination data of the shifted mock scan collected simultaneous with the blank transmission scan.

21. The system as claimed in claim 18, wherein said at least one data processor is programmed for reconstruction of the reconstructed image of the patient from emission data from an emission scan of the patient, and said at least one processor is programmed for using the corrected transmission data of the transmission scan of the patient for attenuation correction of the is emission data from the emission scan for reconstruction of the image of the patient.

22. The system as claimed in claim 18, wherein the nuclear medicine scanner is a positron-emission tomography scanner, the system includes coincidence logic circuitry for discriminating between single and coincidence gamma events detected by the gamma detector, and said at least one processor is programmed for producing the transmission scan data and the emission contamination data from the single gamma events, and for producing the emission scan data from the coincidence gamma events.

23. The system as claimed in claim 18, wherein said at least one processor is programmed for recording event data from the gamma detector and for sorting the recorded event data into two parallel projections to produce the transmission data in one of the parallel projections and the emission contamination data in the other of the parallel projections, and the two parallel projections are axially displaced from each other.

* * * * *